Figure 1:
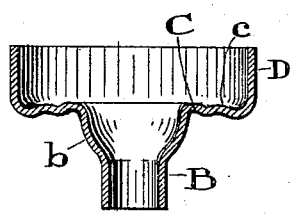

No. 886,808. PATENTED MAY 5, 1908.
G. A. HOLMES.
SNAP FASTENER.
APPLICATION FILED MAY 2, 1906.

Witnesses
P. E. Lanterman
E. H. Bickerton

Inventor
George A Holmes
By Roberts & Mitchell
Attorneys

UNITED STATES PATENT OFFICE.

GEORGE A. HOLMES, OF NEWTON CENTER, MASSACHUSETTS, ASSIGNOR TO UNITED STATES FASTENER COMPANY, OF BOSTON, MASSACHUSETTS, A CORPORATION OF MAINE.

SNAP-FASTENER.

No. 886,808.      Specification of Letters Patent.      Patented May 5, 1908.

Application filed May 2, 1906. Serial No. 314,735.

*To all whom it may concern:*

Be it known that I, GEORGE A. HOLMES, a citizen of the United States, and resident of Newton Center, Massachusetts, have invented a new and useful Improvement in Snap-Fasteners, of which the following, taken in connection with the accompanying drawings, is a specification.

My invention relates to snap fasteners such as are often used for separably attaching two articles or two portions of an article, such as a glove.

My invention relates more particularly to that portion of a snap fastener which is now well known as the stud or ball; and my invention is shown as embodied in a form of ball which from its appearance has heretofore been termed a "bird-cage" stud.

My invention consists in a novel manner of assembling the parts of such a stud and in novel conformations of such parts and in the combinations thereof as set forth in the claims appended hereto.

I may here refer to a prior application of mine filed August 12, 1905, Serial No. 273,889, upon which the present invention is an improvement although the improvement may be embodied in other fasteners than the specific one illustrated in my aforesaid prior application. In said prior application it was an object to dispense with an interior or specially provided device for preventing radial movement or collapse of the arms of the spring bird-cage; and the invention therein contemplated the employment of a peculiar conformation of the bases of the spring arms by bending each one out of its plane, the several bends forming a substantial annular rib or ridge which coöperated with a flanged attaching eyelet intended to be pressed into intimate engagement with the bases of the arms, and by reason of the bends in the arms preventing collapse thereof.

In the present invention, as in said prior application, a flanged attaching eyelet is employed, the shank of which extends downwardly through the material and the flange of which is turned upwardly and over the bases of the spring arms. With the device of said prior application there was liability of an objectionable result; which is overcome in the present invention by forming an arch or dome or the like at the juncture of the eyelet flange and shank. This construction renders the eyelet of great strength to resist endwise pressure which might otherwise result in forcing the metal of the eyelet upwardly into the bird-cage which obviously would interfere with the operation of clenching the lower edge of the eyelet over the washer which in this class of fastener is usually placed below the material.

I will first describe a snap fastener embodying my invention and then point out the novel features in claims.

Figure 3:
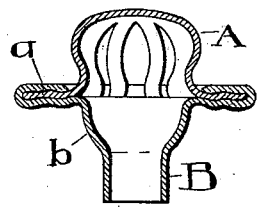
Figure 2:
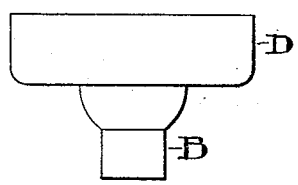
Figure 4:
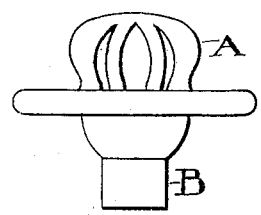
Figure 5:
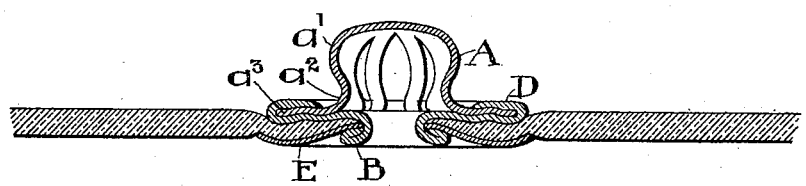

Figure 1 is a cross section of the attaching eyelet before being secured to the bird-cage spring. Fig. 2 is an exterior view of the attaching eyelet shown in Fig. 1. Fig. 3 is a cross section of the attaching eyelet and bird-cage spring secured to each other, but before attachment to the material. Fig. 4 shows an exterior view of the parts seen in Fig. 3. Fig. 5 shows in cross section the fastener of Fig. 3 after having been attached to material.

Similar letters of reference are employed to designate corresponding parts in the several figures of the drawing.

A represents a bird-cage stud consisting of centrally united arms bulged near their upper ends at $a'$ and contracted at a lower point, termed the groove as shown at $a^2$, and then turned outwardly into a substantially flat base or flange $a^3$. This of itself is well known and need not be further described. As seen in Fig. 3, however, the variation from the usual construction will be seen in the existence of a series of beads $a$ formed in the flange or base portions of the spring arms. The metal is bent sufficiently out of the flat to substantially form a ridge or bead $a$. The attaching eyelet, best seen in Fig. 1, comprises a shank B and a flange C which has an upward projection D that is intended to be pressed over upon the bird-cage arms. When the projection D is so pressed over it slightly flattens the bead or rib formed in the spring arms, which in this flattened condition are seen at $a$ in Fig. 3. Preferably the flange C of the attaching eyelet may be formed with a corresponding rib or bead shown at $c$ which interlocks with the bead $a$ and prevents inward and outward movement of the arms of the spring cage.

The device is intended to be attached to fabric by puncturing a hole in the latter, inserting the eyelet shank B which is then passed through a securing washer E below the fabric, and by a suitable machine is turned outwardly or clenched over the securing washer, thus permanently securing the stud to the fabric. This clenching operation requires great force and is liable to force the metal of the eyelet near the juncture of the flange and shank upwardly into the interior of the cage. I preclude this objection, however, by forming the eyelet at said juncture in the dome-like form as shown at $b$ in Figs. 1 and 3. The result of this dome $b$ is twofold. First, it prevents the objectionable result which I have just mentioned by reason of its stiffening the eyelet against being collapsed endwise until the edge of the eyelet is sufficiently clenched over the securing plate E. Thus, effective clenching or securing is attained. After the clenching is accomplished further pressure may, without causing objectionable results, flatten the dome $b$ so that the completely assembled fastener will appear as in Fig. 5. The dome $b$, it will therefore be seen, serves its function during the process of attaching.

Secondly, another beneficial result will be seen by considering a small puncture formed in the fabric which is slipped over the eyelet B, but cannot slip over the dome $b$, which dome during the process of attaching therefore serves to pinch and more tightly hold the fabric which is thus secured between the eyelet and the securing washer in a most advantageous manner.

What I claim as my invention and desire to secure by Letters Patent is:

A snap fastener member comprising the part for engaging a complementary member having an outwardly turned flange, in combination with an attaching eyelet, having a flange turned over into holding contact with the outwardly turned flange of said snap fastener member, a shank adapted to be passed through the material to which the fastener member is to be secured, and a dome-like enlargement at the juncture of the eyelet flange and shank.

In testimony whereof, I have signed my name to this specification in the presence of two subscribing witnesses, on this 30 day of April A. D., 1906.

GEORGE A. HOLMES.

Witnesses:
A. H. FLANNERY,
L. S. CASSEY.